(12) United States Patent
Yang et al.

(10) Patent No.: US 11,261,095 B2
(45) Date of Patent: Mar. 1, 2022

(54) CONTROL SYSTEM AND CONTROL METHOD FOR RECYCLING AND SMELTING CRUSHED SILICA FROM SILICON PLANTS

(71) Applicant: ChengDu Silicon Technology Co., Ltd., Sichuan (CN)

(72) Inventors: Shi Yang, Sichuan (CN); Xu Zhou, Sichuan (CN)

(73) Assignee: ChengDu Silicon Technology Co., Ltd., Chengdu (CN)

( * ) Notice: Subject to any disclaimer, the term of this patent is extended or adjusted under 35 U.S.C. 154(b) by 312 days.

(21) Appl. No.: 16/467,036

(22) PCT Filed: Dec. 7, 2017

(86) PCT No.: PCT/CN2017/115085
§ 371 (c)(1),
(2) Date: Jun. 5, 2019

(87) PCT Pub. No.: WO2018/103713
PCT Pub. Date: Jun. 14, 2018

(65) Prior Publication Data
US 2019/0308882 A1    Oct. 10, 2019

(30) Foreign Application Priority Data
Dec. 9, 2016    (CN) .......................... 201611130091.6

(51) Int. Cl.
C01B 33/021 (2006.01)
B01J 2/26 (2006.01)
B01J 6/00 (2006.01)

(52) U.S. Cl.
CPC ............... *C01B 33/021* (2013.01); *B01J 2/26* (2013.01); *B01J 6/00* (2013.01); *B01J 2204/002* (2013.01)

(58) Field of Classification Search
CPC ............. C01B 33/021; B01J 2/26; B01J 6/00
See application file for complete search history.

(56) References Cited

U.S. PATENT DOCUMENTS

| 3,806,586 A | * | 4/1974 | Mollerstedt | ........... C01B 33/025 |
| | | | | 423/350 |
| 3,973,683 A | * | 8/1976 | Keller | ..................... B66C 13/48 |
| | | | | 414/591 |
| 2011/0097256 A1 | * | 4/2011 | Pizzini | .................. C30B 11/003 |
| | | | | 423/349 |

FOREIGN PATENT DOCUMENTS

| CN | 101528597 A | 9/2009 |
| CN | 103011167 A | 4/2013 |

(Continued)

OTHER PUBLICATIONS

International search report of PCT Patent Application No. PCT/CN2017/115085 dated Feb. 23, 2018.

*Primary Examiner* — Alexandra M Moore
*Assistant Examiner* — Michael Forrest

(57) ABSTRACT

A manufacturing system and method for recycling and smelting crushed silica from silicon plants, including a crushed silica storage device, granulator, submerged arc furnace, transfer device, forming device and cooling system. Firstly silicon waste is collected, then crushed silica is output to a granulator. The granulator mixes the waste irregular crushed silica with water, and granulates and produces small particles having an uniform grain size as the raw material for smelting. The raw material is smelted in the submerged arc furnace. The forming device evenly pours the silicon liquid into the cooling system according to a set flow rate. The silicon liquid is solidified to form silicon pellets, and then a lift system is used to lift the formed silicon pellets, wherein the silicon liquid poured into the cooling (Continued)

system has a uniform diameter. The system can rapidly and efficiently smelt the silicon waste from the silicon plants.

5 Claims, 1 Drawing Sheet

(56) References Cited

FOREIGN PATENT DOCUMENTS

| | | | | |
|---|---|---|---|---|
| CN | 103011167 B | * | 1/2015 | ........... C01B 33/021 |
| CN | 105603291 A | | 5/2016 | |
| CN | 106082234 A | | 11/2016 | |
| CN | 206692338 U | | 12/2017 | |
| EP | 2845671 A1 | * | 3/2015 | ................ B22F 9/08 |
| JP | 6168313 A | | 4/1986 | |

* cited by examiner

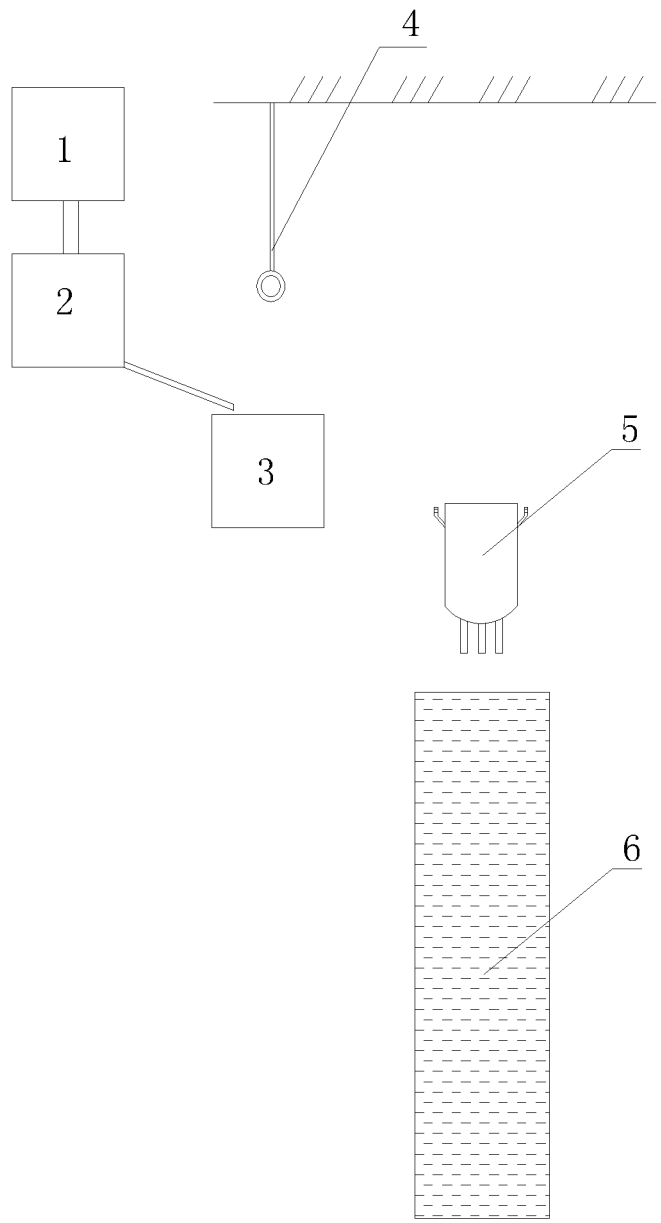

CONTROL SYSTEM AND CONTROL METHOD FOR RECYCLING AND SMELTING CRUSHED SILICA FROM SILICON PLANTS

FIELD OF THE INVENTION

The present invention relates to the field of recycling silicon slag, and more particularly to a manufacturing system and a manufacturing method for recycling and smelting crushed silica from silicon plants.

BACKGROUND OF THE INVENTION

Silicon slag generally refers to a remainder in refining processes of a raw ore, which still contains a quantity of silicon. The silicon slag has various kinds such as industrial silicon slag, solar silicon slag, semiconductor silicon slag and the like. The silicon slag can be recycled and purified to address the problems of a lack of silicon and a high price. Silicomanganese slag, also called silicomanganese smelting slag, is industrial waste slag discharged from the smelting process of the silicomanganese alloy, which has a loose structure and an appearance of light green particles, and is composed of some irregular porous amorphous particles. The silicomanganese slag is fragile and brittle, the bulk silicomanganese slag can be crushed into small pieces by a crusher, and the roughly crushed material is further pulverized in a fine crusher to ensure that the material entering the silo can reaches a degree of monomeric liberation, and is then sorted by being evenly fed into a trapezoid jigger via a vibrating feeder and a belt conveyor. A main purpose of the crush is to break the aggregate structure, while a main purpose of the jigging is to recycle the silicomanganese alloy from the silicomanganese slag. The differences in specific gravity of the silicomanganese slag and the silicomanganese alloy are relatively large, the waste slag being able to be separated from the metal by the gravity separation function of the jigger, thereby obtaining pure alloy and waste slag, and in the end the concentrate ore and gangue being able to be dehydrated respectively by the dehydrating effect of the dewatering screen.

In silicon processing of silicon enterprises, the silicon is first cut and decomposed, and is then used in pieces; in multiple processes of cutting, crushing and detecting, substandard waste silicon is produced inevitably; and the disposal methods for such silicon are not standardized, for example, a part of the silicon is discarded directly, and a part of the silicon is collected and transported to the silicon smelting plant again to be added into and smelted with the silicon ore. However, the whole cycle is long, the poor smelting production efficiency of the silicon ore causes a quite low conversion rate of the crushed silica, and the excessive collection and transportation processes lead to a problem that a cost thereof is higher than that of using the silicon ore to directly smelt the silicon.

BRIEF SUMMARY OF THE INVENTION

The present invention aims to provide a manufacturing system for recycling and smelting crushed silica from silicon plants, achieving a rapid and efficient recovery of waste silicon produced from the silicon plants by establishing a new processing, thereby increasing the conversion rate as well as reducing production cost, and realizing the industrialization of waste silicon recycling.

The present invention is realized by following technical solutions:

A manufacturing system for recycling and smelting crushed silica from silicon plants, comprising:

a crushed silica storage device: used for storing the crushed silica, and used as a raw material supplying device of a manufacturing system, conveying the crushed silica to a granulator by a conveying belt;

the granulator: mixing the crushed silica and water and kneading it to produce particles having an uniform grain size, then conveying to a submerged arc furnace;

the submerged arc furnace: receiving granulated silicon particles, and smelting to form silicon liquid;

a transfer device: transferring the smelted silicon liquid to a forming device;

the forming device: injecting the smelted silicon liquid into a cooling system according to a set grain size; and the cooling system: the silicon liquid being solidified in the cooling system to form silicon pellets.

The technical solutions of the present invention are set for current status of silicon use in enterprises. In prior art, the usage rate of silicon in enterprises is about 70%, and the remaining 30% of the silicon is waste silicon existing in forms of unequal sized silicon bricks, silicon powder, etc. Moreover, such silicon bricks are always accompanied by the using pollution, i.e. the using pollution of various equipment and apparatus, and the waste silicon are always difficult to be used and recycled, while transporting the waste silicon to the silicon plant and smelting the waste silicon with the silicon ore may cause a lower conversion rate and a higher cost for this part of silicon due to the smelting yield of the prior art. To solve this problem in the prior art, the inventor of the present invention, through many years' exploration and experiments, established a manufacturing system for recycling and using the waste silicon of the silicon used by enterprises, comprising following steps: collecting silicon waste of an enterprise in a centralized manner, then outputting crushed silica to a granulator by a conveying belt, the granulator mixing the waste irregular crushed silica with water, then granulating and producing small particles having an uniform grain size, as the raw material for smelting, by the kneading effect; by integrating the irregular crushed silica into particles that have a roughly identical diameter and using it as the raw material, the smelting uniformity can be highly improved, causing the smelting process in a submerged arc furnace to be relatively uniform, and avoiding local instability; the silicon liquid transfer device transferring the smelted silicon liquid and moving above a forming device, the forming device evenly pouring the silicon liquid into a cooling system according to a set flow rate, the silicon liquid being solidified to form silicon pellets, and then using a lift system to lift the formed silicon pellets, wherein the silicon liquid poured into the cooling system has a uniform diameter, solving the problems of the irregular formation and unequal sizes of silicon bricks due to the dumping process in the prior art. The system provided in the present invention can rapidly and efficiently smelt the silicon waste from the silicon enterprises, forming silicon pellets, and the produced silicon pellets can be directly used for the refining of polycrystalline silicon, largely reducing the processes and time of the recycling and improving the conversion rate of the silicon, avoiding secondary generation and secondary pollution of the silicon slag.

When in use, a voltage of the submerged arc furnace is 40-90V. The submerged arc furnace is an industrial electric furnace having a large power consumption amount, and mainly comprises a furnace shell, a furnace cover, furnace lining, a short-web, a water cooling system, a smoke exhaust system, a dedusting system, an electrode shell, an electrode pressure and fluctuation system, a loading and unloading system, a holder, an arc burner, a hydraulic system, a submerged arc furnace transformer and various electric devices. The existing submerged arc furnace is used primarily for smelting ferrosilicon, ferromanganese, ferrochrome, ferrotungsten, silicochrome, calcium carbide, boron carbide and the like, but cannot be used directly for smelting the silicon. The reason is that, in the current common sense, the submerged arc furnace can be normally operated in a range from 100 to 180V. The applicant found during experiments that, when the submerged arc furnace is not operated normally, the thermal absorption rate of the silicon is larger than the thermal release rate thereof. Through several experiments, it is found that when the operating voltage of the submerged arc furnace is 40-90V, the silicon can be smelted to form the silicon liquid, breaking through the technical bottleneck of the silicon smelting.

The transfer device is a track crane. The transfer method of the track crane is fast and effective, which is quite suitable for silicon enterprises.

The cooling system is a rotary cooling pool. The running track of the silicon bricks falling into the cooling water is changed from vertical motion to spiral motion, so as to effectively increase the formation of the silicon bricks. Therefore, a plurality of nozzle groups are disposed on a side wall of a body of the cooling pool, the nozzle groups being distributed at different depth positions, wherein the nozzle groups each comprises one or more nozzles, and the spray direction of the nozzle is distributed along a tangential direction of the circumference of the cooling pool, and is sprayed inwardly. In this way, one nozzle group can drive local cooling water to form a rotation in the cooling pool, so that the running track of the silicon liquid poured into the cool pool becomes spiral motion under the rotation of the water flow, thereby greatly facilitating the formation of the silicon bricks, and achieving the purpose of sufficient heat exchange cooling. The multiple nozzle groups maintain the formation of the rotation at different positions, forming uniform flow filed.

A manufacturing method for recycling and smelting crushed silica from silicon plants, comprising following steps:

(a) granulation: mixing the crushed silica and water and kneading it to produce particles having an uniform grain size in a granulator;

(b) silicon smelting: smelting silicon particles in a submerged arc furnace, producing silicon liquid;

(c) transfer: transferring the silicon liquid to a forming device by a transfer device;

(d) forming: the forming device exporting the silicon liquid according to a set grain size, then the silicon liquid entering a rotary cooling pool, and being cooled to form silicon pellets.

Another object of the present invention is to provide a new silicon smelting process to solve the problems existing in the current silicon enterprises of a low silicon utilization rate, a high cost of waste silicon disposal and low efficiency, wherein the silicon smelting process comprises following steps: collecting silicon waste of an enterprise in a centralized manner, then outputting crushed silica to a granulator by a conveying belt, the granulator mixing the waste irregular crushed silica with water, then granulating and producing small particles having an uniform grain size, as the raw material for smelting, by the kneading effect; by integrating the irregular crushed silica into particles that have a roughly identical diameter and using it as the raw material, the smelting uniformity can be highly improved, causing the smelting process in a submerged arc furnace to be relatively uniform, and avoiding local instability; the silicon liquid transfer device transferring the smelted silicon liquid and moving above a forming device, the forming device evenly pouring the silicon liquid into a cooling system according to a set flow rate, the silicon liquid being solidified to form silicon pellets, and then using a lift system to lift the formed silicon pellets, wherein the silicon liquid poured into the cooling system has a uniform diameter, solving the problems of the irregular formation and unequal sizes of silicon bricks due to the dumping process in the prior art. The system provided in the present invention can rapidly and efficiently smelt the silicon waste from the silicon plants, forming silicon pellets, and the produced silicon pellets can be directly used for the refining of polycrystalline silicon, largely reducing the processes and time of the recycling and improving the conversion rate of the silicon, avoiding secondary generation and secondary pollution of the silicon slag.

During the silicon smelting in step (b), an operating voltage of the submerged arc furnace is 40-90V.

The operating voltage of the submerged arc furnace is 60-70V. After years of experiment and analysis, the applicant found the better production parameter for using the submerged arc furnace to refine silicon, and the faster melting speed of the silicon within this voltage range. Although the present invention adopts the structure of the submerged arc furnace, the operating parameters thereof is significantly adjusted to have an operating voltage of 60-70V, which the latter is actually an abnormal operating range of the submerged arc furnace. Using the abnormal operating conditions to smelt the silicon is greatly beyond the knowledge of the people skilled in the art, and also meets the requirements of the silicon smelting, achieving unexpected advantages, appearing thorough progress in the field of silicon smelting, significantly increasing the mass production of silicon smelting and promoting the development of the industry.

Compared with the prior art, the present invention has following advantages and beneficial effects:

1. the present invention providing a manufacturing system and a manufacturing method for recycling and smelting crushed silica from silicon plants, comprising following steps: firstly collecting silicon waste of an enterprise in a centralized manner, then outputting crushed silica to a granulator by a conveying belt, the granulator mixing the waste irregular crushed silica with water, then granulating and producing small particles having an uniform grain size, as the raw material for smelting, by the kneading effect; by integrating the irregular crushed silica into particles that have a roughly identical diameter and using it as the raw material, the smelting uniformity can be highly improved, causing the smelting process in a submerged arc furnace to be relatively uniform, and avoiding local instability; the silicon liquid transfer device transferring the smelted silicon liquid and moving above a forming device, the forming device evenly pouring the silicon liquid into a cooling system according to a set flow rate, the silicon liquid being solidified to form silicon pellets, and then using a lift system to lift the formed silicon pellets, wherein the silicon liquid poured into the cooling system has a uniform diameter, solving the problems of the irregular formation and unequal sizes of silicon bricks due to the dumping process in the prior art. The system provided in the present invention can rapidly and efficiently smelt the silicon waste from the silicon plants, forming silicon pellets, and the produced silicon pellets can be directly used for the refining of polycrystalline silicon, largely reducing the processes and time of the recycling and improving the conversion rate of the silicon, avoiding secondary generation and secondary pollution of the silicon slag.

2. The present invention provides a manufacturing system and a manufacturing method for recycling and smelting crushed silica from silicon plants. Although the present invention adopts the structure of the submerged arc furnace, the operating parameters thereof is significantly adjusted to have an operating voltage of 60-70V, which the latter is actually an abnormal operating range of the submerged arc furnace. Using the abnormal operating conditions to smelt the silicon is greatly beyond the knowledge of the people skilled in the art, and also meets the requirements of the silicon smelting, achieving unexpected advantages, appearing thorough progress in the field of silicon smelting, significantly increasing the mass production of silicon smelting and promoting the development of the industry.

BRIEF DESCRIPTION OF THE DRAWINGS

The drawings described herein are intended to provide a further understanding of the embodiments of the present invention and form a part of the application, however does not constitute a limitation of the embodiments of the present invention. In the drawings:

FIG. 1 is a view illustrating the principle of the present invention.

The symbols and the corresponding component names:

1—crushed silica storage device, 2—granulator, 3—submerged arc furnace, 4—transfer device, 5—forming device, 6—rotary cooling pool.

DETAILED DESCRIPTION OF THE PREFERRED EMBODIMENTS

In order to clarify the purpose, solution and advantages for the present invention, with reference to the accompanying embodiments and drawings, the present invention is further described in detail, the embodiments and the illustrations thereof is merely illustrative of the invention and are not intended to limit the invention.

Example

As shown in FIG. 1, the present invention provides a manufacturing system and a manufacturing method for recycling and smelting crushed silica from silicon plants, particularly from a medium-sized silicon enterprise whose silicon amount used per month is 3000 tons and the waste silicon amount is from 80 to 100 tons per month. According to this enterprise's concrete conditions, the manufacturing system is configured as follows: a crushed silica storage device 1 for storing the crushed silica, a warehouse having an area of 20 square meters, wherein an upper portion of the crushed silica storage device 1 is used as an inlet for the collected material, and a lower portion is provided with an outlet used as a raw material supplying device of the manufacturing system, and conveying the crushed silica to a granulator 2 through a conveying belt; the granulator 2: mixing the crushed silica and water and kneading it to produce particles having an uniform grain size, then conveying the particles to a submerged arc furnace 3, wherein a single pot production of the submerged arc furnace is 1 ton, and the smelting time for each time is about 1 hour; the submerged arc furnace 3 receiving granulated silicon particles, and smelting to form silicon liquid, wherein an operating voltage of the submerged arc furnace 3 during smelting uses an abnormal operating voltage range of 40-90V, and the preferred operating voltage is 60-70V; After a silicon liquid being smelted, a track crane installed in the plant area as a transfer device 4 transferring the smelted silicon liquid to a forming device 5; the forming device 5 comprising a cylindrical container body, and a container bottom matching with the container body, wherein a layer of lining is disposed in the container body, the container bottom and the container body form a detachable structure, and at least one through hole and a detachable draft tube connected to the at least one through hole are disposed on the container bottom, the lower portion of the container body is closed to form a bottom of the container, wherein one or more through holes are disposed on the bottom, and the detachable draft tube is disposed in the through hole, the layer of lining is disposed in the container body, an insulating layer is disposed between the container body and the lining, wherein the container body, insulating layer and lining each forms a stepped structure at the detachment position, and the outer end surface of the container bottom also has a stepped structure, wherein after the engagement, an outer shell of the container bottom is connected to the container body to form an integral structure, the lining on the bottom is connected to the lining disposed in the container body to from an integral structure, and a cavity is formed between the insulating layer and the container bottom, wherein a sealing ring is installed in the cavity, configuring the end surfaces of the container body, insulating and lining to be a stepped structure and installing the sealing ring in the cavity can further firm the connection between the container body and the container bottom; a plurality of lifting teeth disposed on an outer side of the container body, and a hook matching with the plurality of the lifting teeth disposed on the container bottom, and the container body connected with the container bottom through the engagement of lifting teeth and the hooks; and the smelted silicon liquid injected into a rotary cooling pool 6 according to a set grain size, wherein a plurality of nozzle groups are disposed on a side wall of a body of the cooling pool, the nozzle groups being distributed at different depth positions, wherein the nozzle groups each comprises one or more nozzles, and the spray direction of the nozzle is distributed along a tangential direction of the circumference of the cooling pool, and is sprayed inwardly, in this way, one nozzle group can drive local cooling water to form a rotation in the cooling pool, so that the running track of the silicon liquid poured into the cooling pool becomes spiral motion under the rotation of the water flow, thereby greatly facilitating the formation of the silicon bricks, and achieving the purpose of sufficient heat exchange cooling.

In this example, the scraps generated in the silicon refining processes of an enterprise can be directly smelted and recycled to form silicon pellets in the plant area, thereby avoiding transferring process that transfers the scraps to the silicon refinery. Meanwhile, compared with the low conversion rate of the traditional silicon refinery, the device and process provided in the present invention can improve the conversion rate of the silicon to 98% or more, effectively avoiding the secondary pollution and largely improve the production efficiency.

The specific embodiment described above further explains the purposes, technical solutions and beneficial effects of the present invention. It is to be understood that the foregoing is only illustrative of the embodiment of the present invention, and is not intended to limit the scope of the present invention. Any modifications, equivalents, and improvements made within the spirit and scope of the present invention should be included in the scope of protection of the present invention.

What is claimed is:

1. A control system for recycling and smelting crushed silica from silicon plants, comprising:
    a crushed silica storage device used for storing the crushed silica, and used as a raw material supplying device of the control system, conveying the crushed silica to a granulator by a conveying belt;
    the granulator mixing the crushed silica and water to form a first mixture, and kneading the first mixture to produce particles having a uniform grain size, then conveying the particles to a submerged arc furnace;
    the submerged arc furnace receiving granulated silica particles, and smelting the granulated silica particles to form silicon liquid;
    a transfer device transferring the smelted silicon liquid to a forming device;
    the forming device injecting the smelted silicon liquid into a cooling system according to a set grain size; and
    the cooling system solidifying the silicon liquid to form silicon pellets;
    wherein, the crushed silica storage device adopts a warehouse comprising an upper portion used as an inlet for the raw material and a lower portion provided with an outlet used for conveying the crushed silica to the granulator through the conveying belt;
    the transfer device is a track crane;
    the forming device comprises a cylindrical container body and a container bottom matching with the container body, wherein a layer of lining is disposed in the container body, the container bottom and the container body form a detachable structure, and at least one through hole and a detachable draft tube connected to the at least one through hole are disposed on the container bottom;
    the cooling system is a rotary cooling pool, a plurality of nozzle groups are disposed on a side wall of a body of the cooling pool and distributed at different depth positions, wherein the nozzle groups each comprises one or more nozzles, the nozzles are distributed along a tangential direction of the circumference of the cooling pool, and the nozzles spray inwardly.

2. The control system of claim 1, wherein a voltage of the submerged arc furnace is 40-90V.

3. A control method for recycling and smelting crushed silica from silicon plants, comprising following steps:
    (a) granulation: mixing the crushed silica and water to form a first mixture and kneading the first mixture to produce particles having a uniform grain size in a granulator;
    (b) silicon smelting: smelting silica particles in a submerged arc furnace to produce silicon liquid;
    (c) transfer: transferring the silicon liquid to a forming device by a transfer device;
    (d) forming: the forming device exporting the silicon liquid according to a set grain size, then the silicon liquid entering a rotary cooling pool, and being cooled to form silicon pellets
    wherein the transfer device is a track crane;
    the forming device comprises a cylindrical container body and a container bottom matching with the container body, wherein a layer of lining is disposed in the container body, the container bottom and the container body form a detachable structure, and at least one through hole and a detachable draft tube connected to the at least one through hole are disposed on the container bottom;
    a plurality of nozzle groups are disposed on a side wall of a body of the cooling pool and distributed at different depth positions, wherein the nozzle groups each comprises one or more nozzles, the nozzles are distributed along a tangential direction of the circumference of the cooling pool, and the nozzles spray inwardly.

4. The control method of claim 3, wherein during the silicon smelting in step (b), an operating voltage of the submerged arc furnace is 40-90V.

5. The control method of claim 4, wherein the operating voltage of the submerged arc furnace is 60-70V.

* * * * *